United States Patent [19]
Kageyama et al.

[11] Patent Number: 5,976,709
[45] Date of Patent: Nov. 2, 1999

[54] ALUMINUM ALLOY MEMBER, WITH INSERT PROVIDED THEREIN, POSSESSING IMPROVED DAMPING CAPACITY AND PROCESS FOR PRODUCING THE SAME

[75] Inventors: Nozomu Kageyama, Kumagaya; Akichika Itoh, Fukuoka-ken; Etsuroh Tamura, Kumagaya; Koki Kanno; Takahito Aoki, both of Musashino; Terushige Sato, Fuchu, all of Japan

[73] Assignees: Hitachi Kinzoku Kabushiki Kaisha; Fuji Jukogyo Kabushiki Kaisha, both of Tokyo, Japan

[21] Appl. No.: 08/862,387

[22] Filed: May 23, 1997

[30] Foreign Application Priority Data

May 31, 1996 [JP] Japan ..................... 8-160514

[51] Int. Cl.$^6$ ............. B32B 15/18; B32B 15/20; B22D 19/16
[52] U.S. Cl. ............. 428/614; 428/653; 164/98
[58] Field of Search ................... 428/614, 653; 148/531; 164/98; 180/381, 377

[56] References Cited

U.S. PATENT DOCUMENTS

| | | | |
|---|---|---|---|
| 3,893,873 | 7/1975 | Hanai et al. | 148/321 |
| 4,266,638 | 5/1981 | Petersen et al. | 188/218 |
| 4,334,507 | 6/1982 | Köhnert et al. | 123/193 |
| 4,596,606 | 6/1986 | Kovacs et al. | 148/545 |
| 4,666,533 | 5/1987 | Kovacs et al. | 148/321 |
| 4,858,670 | 8/1989 | Field et al. | 164/98 |
| 4,867,804 | 9/1989 | Kobayashi | 148/545 |
| 5,248,354 | 9/1993 | Tada et al. | 148/545 |
| 5,333,668 | 8/1994 | Jorstad et al. | 164/100 |
| 5,537,969 | 7/1996 | Hata et al. | 123/193.2 |

FOREIGN PATENT DOCUMENTS

| | | |
|---|---|---|
| 0323021 | 7/1989 | European Pat. Off. . |
| 1519589 | 8/1978 | United Kingdom . |
| 2072065 | 9/1981 | United Kingdom . |
| 2135222 | 8/1984 | United Kingdom . |
| 2200583 | 8/1988 | United Kingdom . |
| 2035448 | 6/1990 | United Kingdom . |
| 2274858 | 8/1994 | United Kingdom . |

OTHER PUBLICATIONS

International Standard ISO 945, Cast iron—Designation of microstructure of graphite, Ref. No. ISO 945–1975E, pp. 1–8, Nov. 1975.

*Primary Examiner*—John J. Zimmerman
*Attorney, Agent, or Firm*—Smith, Gambrell & Russell, LLP; Beveridge, DeGrandi, Weilacher & Young

[57] ABSTRACT

Thin automobile components, such as a transmission case made of an aluminum alloy, are provided which are less likely to create vibration-derived noise. An aluminum alloy member, with an insert provided therein, possessing improved damping capacity, comprising: an austempered graphite cast iron member inserted into an aluminum alloy with the thickness of a section constituting a product being not more than 6 mm. A process for producing an aluminum alloy member, with an insert provided therein, wherein cooling is performed so as for the temperature of a graphite cast iron material to reach 400° C. or below within 10 sec after pouring of an aluminum alloy. The graphite cast iron material comprises by weight 2.5 to 4.0% of carbon, 2.0 to 3.5% of silicon, 0.1 to 0.8% of manganese, and at least one member selected from the group consisting of 0.1 to 2.0% of copper, 0.1 to 2.0% of nickel, and 0.05 to 0.5% of molybdenum with the balance consisting of iron and unavoidable impurities. The aluminum alloy comprises by weight 2.0 to 4.0% of copper, 7 to 12% of silicon, and not more than 0.3% of magnesium with the balance consisting of aluminum and unavoidable impurities.

10 Claims, 11 Drawing Sheets

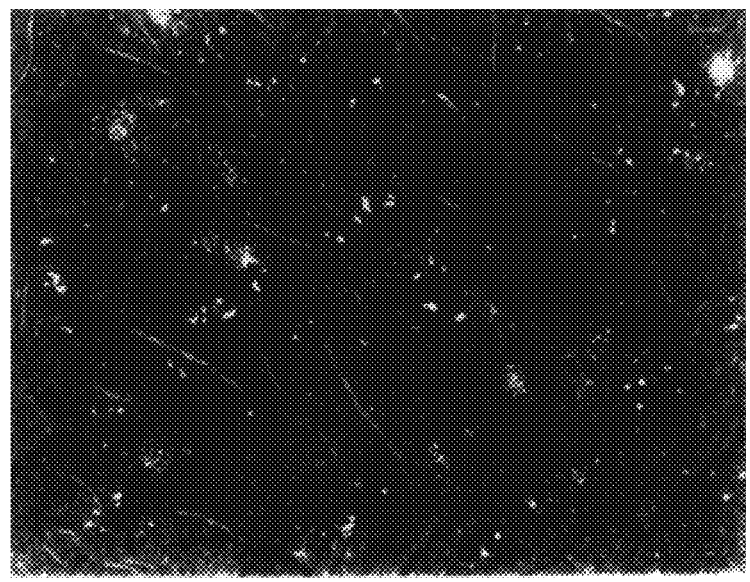
F I G. 3a
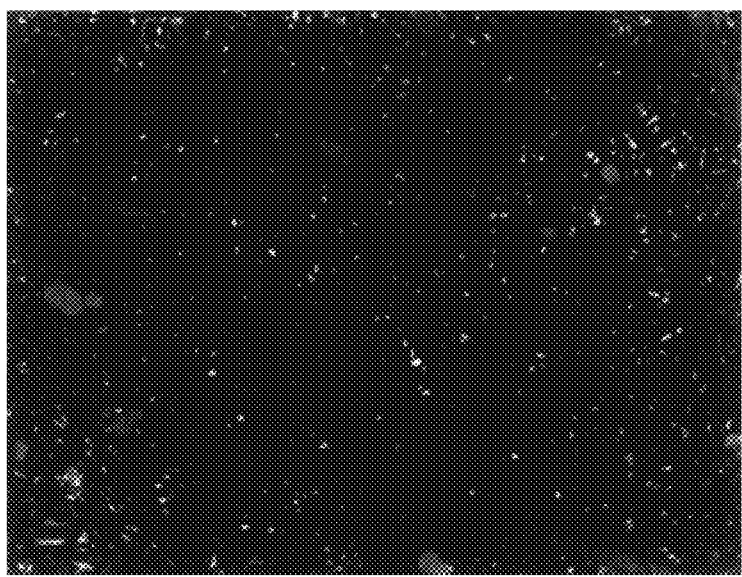
F I G. 3b 0.4 mm 0.1 mm 0.4mm 0.1mm

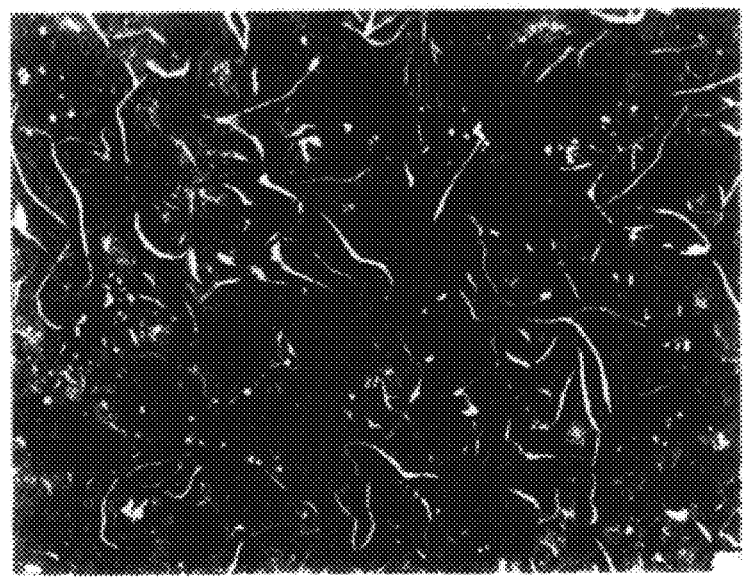
0.4 mm
F I G. 8a
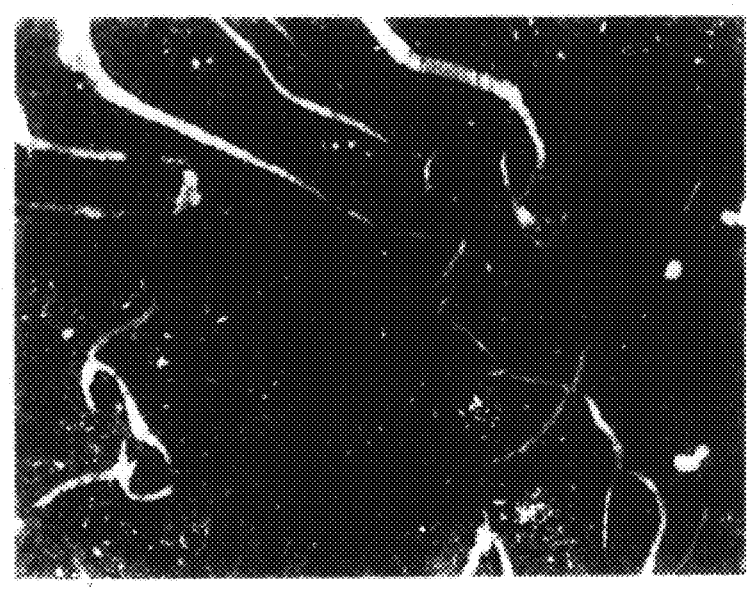
0.1 mm
F I G. 8b

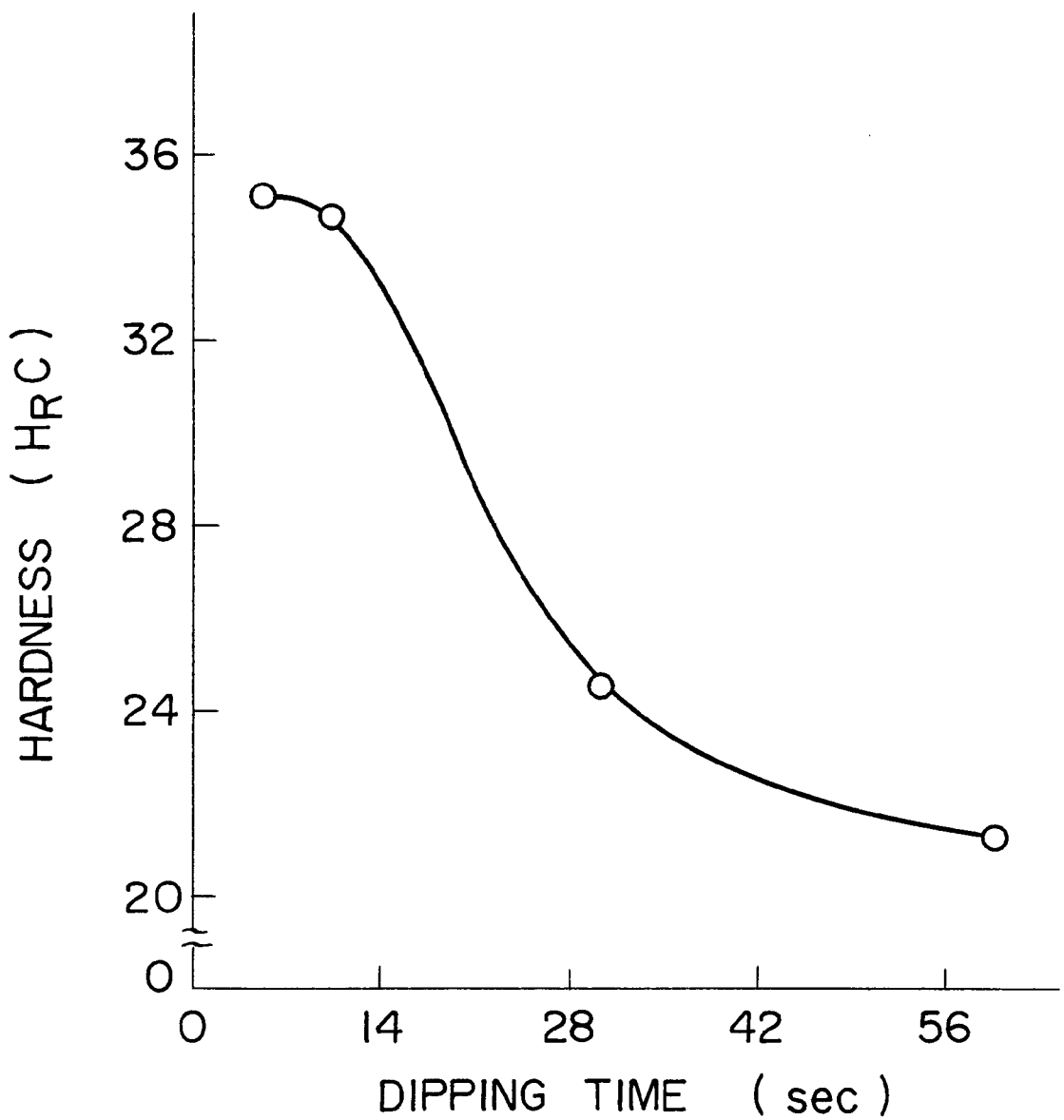
F I G. 9

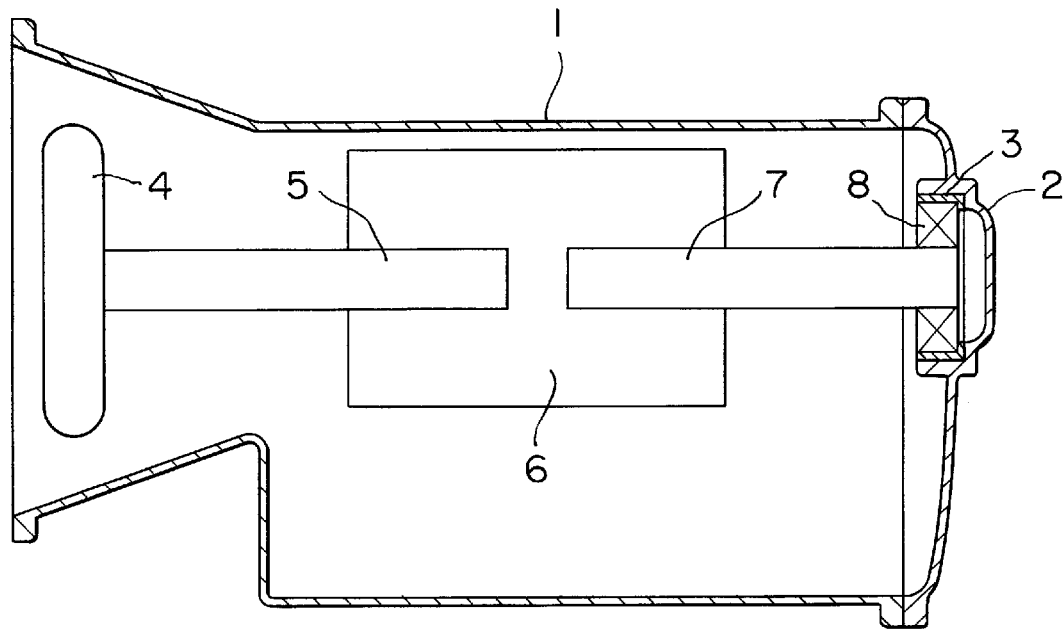
F I G. 10
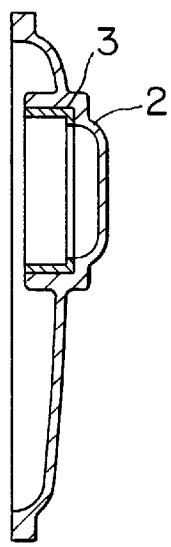
F I G. 11

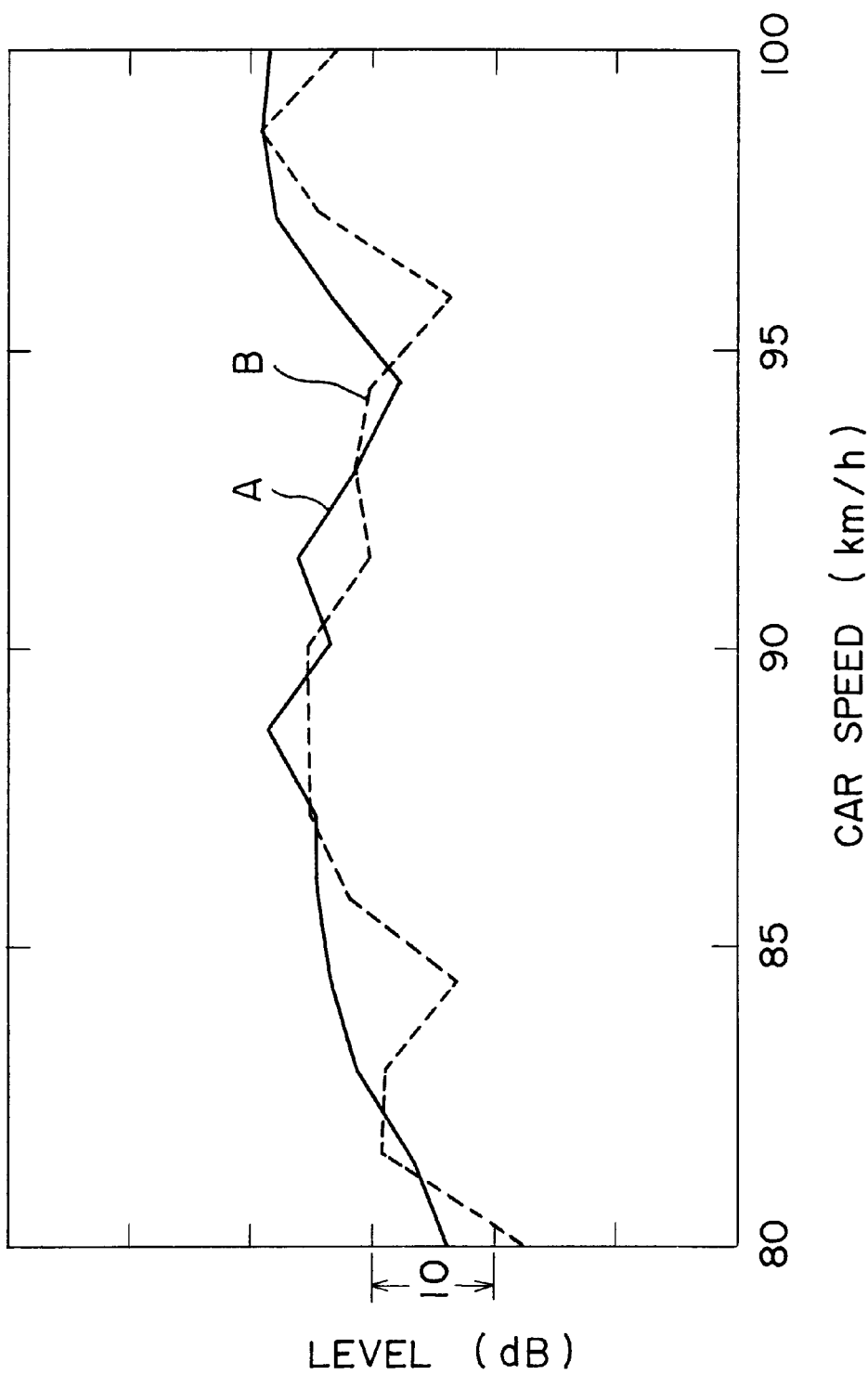
F I G. 12

ALUMINUM ALLOY MEMBER, WITH INSERT PROVIDED THEREIN, POSSESSING IMPROVED DAMPING CAPACITY AND PROCESS FOR PRODUCING THE SAME

FIELD OF THE INVENTION

The present invention relates to a die-cast product, of an aluminum alloy, having a through hole for supporting bearings of transmission cases or the like for automobiles and in particular to an aluminum alloy member, with an insert provided therein, possessing improved vibration damping capacity and causing no significant noise.

BACKGROUND OF THE INVENTION

In recent years, an attempt to reduce the weight of automobiles has been carried forward from the viewpoints of resource saving and energy saving. In order to reduce the weight of automobiles, a change in structure and a change in materials for various components constituting automobiles have been enthusiastically performed in the art. In particular, a change in the material from iron having high specific gravity to a light alloy, such as an aluminum alloy, has been performed because the reduction in weight can be simply achieved.

Components for which the material is changed from iron to the aluminum alloy range from engine components occupying about 20% of the weight of the vehicle to drive system components and suspension system components. For example, the transmission case has hitherto been made of iron. However, use of a light alloy for forming the transmission case has been studied for the above reason. The transmission case covers the outside of a transmission portion having a number of gears which serve to transmit the output from an engine to a drive shaft and change number of revolutions. A rear cover requires a bearing-holding hole for supporting the drive shaft and is formed in a small thickness because the mechanical strength of the body is not required to be very high.

An increase in performance and grade of automobiles in recent years has led to an ever-increasing demand for a reduction in vibration and noise level. In this case, the preparation of a transmission case containing a number of gears, which are rotated at a high speed, and a rear cover for the transmission case using an aluminum alloy poses a problem of noise derived from vibration. Specifically, in the case of the conventional transmission case made of iron, the above problem is not very serious because the damping capacity of the material per se is high, whereas use of the aluminum alloy instead of iron poses the above problem due to low damping capacity of the material per se (aluminum alloy).

SUMMARY OF THE INVENTION

An object of the present invention is to provide an aluminum alloy member, with an insert provided therein, which is less likely to create vibration-derived noise.

According to the present invention, there is provided an aluminum alloy member, with an insert provided therein, possessing improved damping capacity, comprising an austempered graphite cast iron member, particularly a flake graphite cast iron, inserted into an aluminum alloy member with a major part having a thickness of not more than 6 mm. The graphite cast iron material as an insert for the aluminum alloy preferably comprises by weight 2.5 to 4.0% of carbon, 2.0 to 3.5% of silicon, 0.1 to 0.8% of manganese, and at least one member selected from the group consisting of 0.1 to 2.0% of copper, 0.1 to 2.0% of nickel, and 0.05 to 0.5% of molybdenum with the balance consisting of iron and unavoidable impurities. The aluminum alloy, into which the graphite cast iron is inserted, preferably comprises by weight 2.0 to 4.0% of copper, 7 to 12% of silicon, and not more than 0.3% of magnesium with the balance consisting of aluminum and unavoidable impurities. According to another aspect of the present invention, there is provided a process for producing an aluminum alloy member, with an insert provided therein, comprising subjecting an austempered graphite cast iron member to insert casting using a molten aluminum alloy, wherein cooling is performed so as for the temperature of the graphite cast iron material to reach 400° C. or below within 10 sec after pouring of the aluminum alloy. High-pressure casting, particularly die casting, may be used as the insert casting.

According to the present invention, despite the use of an aluminum alloy, which has light weight but low damping capacity, automobile components can be produced which create no significant vibration-derived noise. In particular, thin automobile components, such as transmission cases, can be produced by die casting having excellent mass productivity.

BRIEF DESCRIPTION OF THE DRAWINGS

FIG. 1 is an optical photomicrograph of a metallographic structure of a BA material, in its nonimmersed portion, after immersion in a molten aluminum alloy for 5 sec according to an example of the present invention, wherein

FIG. 2 is an optical photomicrograph of a metallographic structure of a BA material, in its immersed portion, after immersion in a molten aluminum alloy for 5 sec according to an example of the present invention, wherein

FIG. 3 is an optical photomicrograph of a metallographic structure of a BA material, in its nonimmersed portion, after immersion in a molten aluminum alloy for 10 sec according to an example of the present invention, wherein FIG. 3a is a photomicrograph at a magnification of 100 times and FIG. 3b a photomicrograph at a magnification of 400 times.

FIG. 4 is an optical photomicrograph of a metallographic structure of a BA material, in its immersed portion, after immersion in a molten aluminum alloy for 10 sec according to an example of the present invention, wherein

FIG. 5 is an optical photomicrograph of a metallographic structure of a BA material, in its nonimmersed portion, after immersion in a molten aluminum alloy for 30 sec according to a comparative example, wherein

FIG. 6 is an optical photomicrograph of a metallographic structure of a BA material, in its immersed portion, after immersion in a molten aluminum alloy for 30 sec according to a comparative example, wherein

FIG. 7 is an optical photomicrograph of a metallographic structure of a BA material, in its nonimmersed portion, after immersion in a molten aluminum alloy for 60 sec according to a comparative example, wherein

FIG. 8 is an optical photomicrograph of a metallographic structure of a BA material, in its immersed portion, after immersion in a molten aluminum alloy for 60 sec according to a comparative example, wherein FIG. 8a is a photomicrograph at a magnification of 100 times and FIG. 8b a photomicrograph at a magnification of 400 times.

FIG. 9 is a graph showing the relationship between the time of immersion of a specimen of a BA material into a molten aluminum alloy and the hardness $H_RC$;

FIG. 10 is a cross-sectional view of a transmission according to one embodiment of the present invention;

FIG. 11 is a cross-sectional view of a rear cover for a transmission case according to one embodiment of the present invention; and FIG. 12 is a graph showing the relationship between the speed and the radiated sound level with respect to a rear cover for a transmission case.

DETAILED DESCRIPTION OF THE INVENTION

Figure 1A:
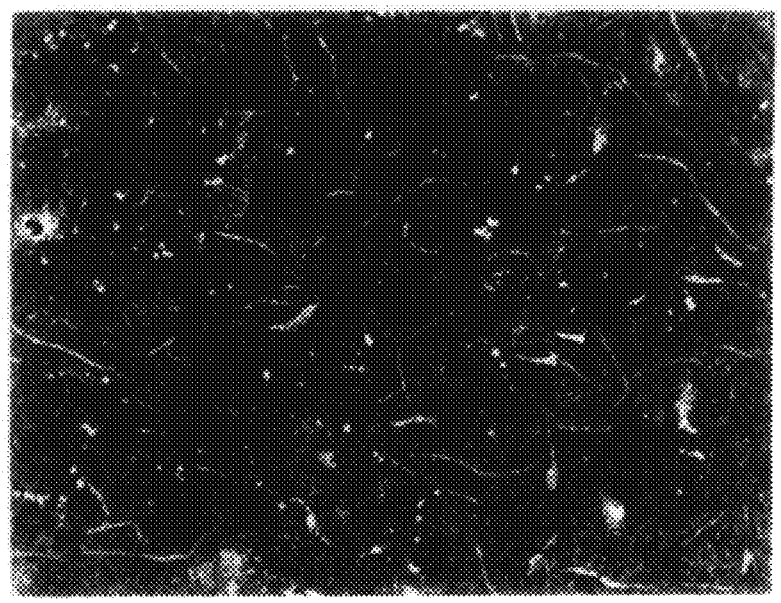
FIG. 1a is a photomicrograph at a magnification of 100 times and FIG. 1b a photomicrograph at a magnification of 400 times.

It is known that noise is attributable to the propagation of vibration of an engine from bearings, for supporting a drive shaft, and a bearing-supporting hole portion to a transmission case. The present inventors have aimed at insertion of an iron member, having excellent damping capacity, into the bearing-holding hole portion by casting in order to solve the above problem and, at the same time, to reinforce the bearing-holding hole portion. As a result, they have found that a cast iron with graphite having a particular form has particularly excellent damping capacity.

In general, an austempered graphite cast iron member, which, when heated to around the transformation point at the time of insert casting, causes bainite to be transformed into pearlite, resulting in the breaking of the formed BA structure, that is, a structure comprising retained austenite with the balance consisting of bainite. The present inventors have found that, even when the temperature of the graphite cast iron member is raised to above 400° C., cooling of the graphite cast iron member to 400° C. or below within 10 sec after the temperature of the graphite cast iron member reached above 400° C. causes substantially no transformation of the bainite structure to the pearlite structure. Further, they have found that high-pressure casting, such as die casting or squeeze casting, is preferred for insert casting with die casting being particularly preferred.

The aluminum alloy member, with an insert provided therein, possessing improved damping capacity, comprises an austempered graphite cast iron material inserted into an aluminum alloy with a major part having a thickness of not more than 6 mm. Better damping capacity can be achieved when the graphite cast iron material is flake graphite cast iron.

The graphite cast iron material as an insert for the aluminum alloy is preferably an iron-base alloy comprising by weight 2.5 to 4.0% of carbon, 2.0 to 3.5% of silicon, 0.1 to 0.8% of manganese, and at least one member selected from the group consisting of 0.1 to 2.0% of copper, 0.1 to 2.0% of nickel, and 0.05 to 0.5% of molybdenum with the balance consisting of iron and unavoidable impurities. Preferably, the graphite is in the form of a ISO type A austempered flake graphite. The graphite cast iron member preferably has a structure comprising 5.0 to 14.0% of retained austenite with the balance consisting of bainite. The aluminum alloy, into which the graphite cast iron is inserted, preferably comprises by weight 2.0 to 4.0% of copper, 7 to 12% of silicon, and not more than 0.3% of magnesium with the balance consisting of aluminum. In the process for producing an aluminum alloy member with an insert provided therein, high-pressure casting, such as die casting or squeeze casting, is preferred with die casting being particularly preferred.

The aluminum alloy member with an insert provided therein, when used as an automobile component, can exhibit excellent properties. Preferred automobile components include transmission cases and rear covers for a transmission.

The reasons for the limitation of each constituent feature in the present invention will be described.

When the thickness of the major part constituting a product of an aluminum alloy member with an insert provided therein is small and not more than 6 mm, the above problem of vibration occurs. On the other hand, when the thickness is larger than 6 mm, the damping capacity of the aluminum alloy member is high by virtue of favorable effect of the thickness of the member, eliminating the need to apply the present invention to the member. In the present invention, the expression "thickness of the major part of an aluminum alloy material with an insert provided therein" refers to the thickness of thin sections, such as sections other than bosses and ribs, in thin members.

The graphite cast iron member should have some degree of mechanical strength for holding bearings supporting a drive shaft. According to the present invention, austempering of a graphite-containing iron alloy to form a structure comprising retained austenite with the balance consisting of bainite, that is, a BA structure, results in further improved toughness and fatigue strength. Further, the bainite-containing structure offers higher damping capacity than the structure consisting of graphite alone. In particular, when the graphite cast iron is flake graphite cast iron, it can offer superior damping capacity than spherical graphite cast iron, leading to an expectation of better effect.

The reasons for limitation of chemical compositions of the graphite cast iron member will be described.

Carbon, as with silicon, is an important constituent of cast iron. When the carbon content is less than 2.5%, chilling is likely to occur, while when it exceeds 4.0%, dross is likely to be produced. Therefore, the carbon content is limited to 2.5 to 4.0%.

Silicon, as with carbon, is an important constituent of cast iron. When the silicon content is less than 2.0%, the fluidity of the melt pouring into the mold is unsatisfactory. On the other hand, a silicon content exceeding 3.5% leads to a deterioration in toughness. Therefore, the silicon content is limited to 2.0 to 3.5%.

Manganese is an element which is necessary for enhancing the hardenability. When the manganese content is less than 0.1%, the contemplated effect is unsatisfactory. On the other hand, a manganese content exceeding 0.8% leads to a deterioration in toughness. For this reason, the manganese content is limited to 0.1 to 0.8%.

Copper is a useful element which has the effect of accelerating the transformation to bainite. When the copper content is less than 0.1%, the contemplated effect is unsatisfactory. On the other hand, a copper content exceeding 2.0% leads to a deterioration in toughness. Therefore, the copper content is limited to 0.1 to 2.0%.

Nickel is a useful element which has the effect of accelerating the transformation to bainite. When the nickel content is less than 0.1%, the contemplated effect is unsatisfactory. On the other hand, a nickel content exceeding 2.0% leads to a deterioration in toughness. Therefore, the nickel content is limited to 0.1 to 2.0%.

Molybdenum is a useful element which has the effect of accelerating the transformation to bainite. When the molybdenum content is less than 0.05%, the contemplated effect is unsatisfactory. On the other hand, a molybdenum content exceeding 0.5% leads to a deterioration in toughness. For this reason, the molybdenum content is limited to 0.05 to 0.5%.

Copper, nickel, and molybdenum may be added either alone or in combination of two or more of them.

The graphite cast iron is preferably heat-treated by austempering in such a manner that a cast product is held at 820 to 950° C. for 0.5 to 5 hr to give an austenitized product which is then immediately held at 280° C. or above for 0.5 hr or more.

Preferably, the structure of the graphite cast iron member comprises a structure comprising 5.0 to 14.0% of retained austenite with the balance consisting of bainite. When the amount of the retained austenite is less than 5.0%, workability, such as cuttability, is remarkably deteriorated. On the other hand, when it exceeds 14.0%, the vibration damping capacity is lowered.

The composition of the aluminum alloy, into which an insert is inserted, will be described.

Preferably, the aluminum alloy comprises by weight 2.0 to 4.0% of copper, 7 to 12% of silicon and not more than 0.3% of magnesium with the balance consisting of aluminum and unavoidable impurities.

Copper is added to improve the mechanical strength of the product. When the copper content is less than 2.0%, the contemplated effect is unsatisfactory, while when it exceeds 4.0%, the elongation is remarkably deteriorated resulting in increased susceptibility to cracking.

Silicon serves to improve the fluidity of the melt and, at the same time, to reduce the shrinkage. When the silicon content is less than 7%, the contemplated effect is unsatisfactory. On the other hand, when it exceeds 12%, the number of primary crystals of silicon is increased resulting in deteriorated mechanical strength, workability, fluidity, and shrinking resistance.

Magnesium is added to improve the mechanical strength. When the amount of magnesium added exceeds 0.3%, the toughness is deteriorated.

DESCRIPTION OF PREFERRED
EMBODIMENTS

EXAMPLE 1

An experiment was carried out to examine whether or not raising the temperature of a BA material caused the transformation of the structure of the BA material. A molten iron alloy comprising by weight 3.04% of carbon, 2.27% of silicon, 0.76% of manganese, 0.31% of molybdenum, and 0.51% of copper with the balance consisting of iron was poured into a sand mold at a pouring temperature of 1380° C. to prepare a flake graphite cast iron member.

The flake graphite cast iron member was austempered in such a manner that it was heated to 850° C., held at that temperature for 2 hr, and, immediately after that, immersed in a salt bath kept at 390° C. The structure of this member comprised a flake graphite and retained austenite with the balance consisting of bainite, and the content of the retained austenite in the structure was 8.6%. The member was then machined to prepare specimens, of the BA material, having a size of 10 mm×10 mm×20 mm.

The specimens were then immersed in a molten aluminum alloy, of 580° C., comprising by weight 2.3% of copper, 10.5% of silicon, 0.11% of magnesium, 0.8% of iron, 0.71% of zinc, and 0.23% of manganese with the balance consisting of aluminum, respectively for 5, 10, 30, and 60 sec. In this case, one half of each of the specimens was immersed in the molten aluminum alloy with the other half being nonimmersed. Thereafter, the treated specimens were allowed to cool in air and examined for a change in structure.

Figure 1B:
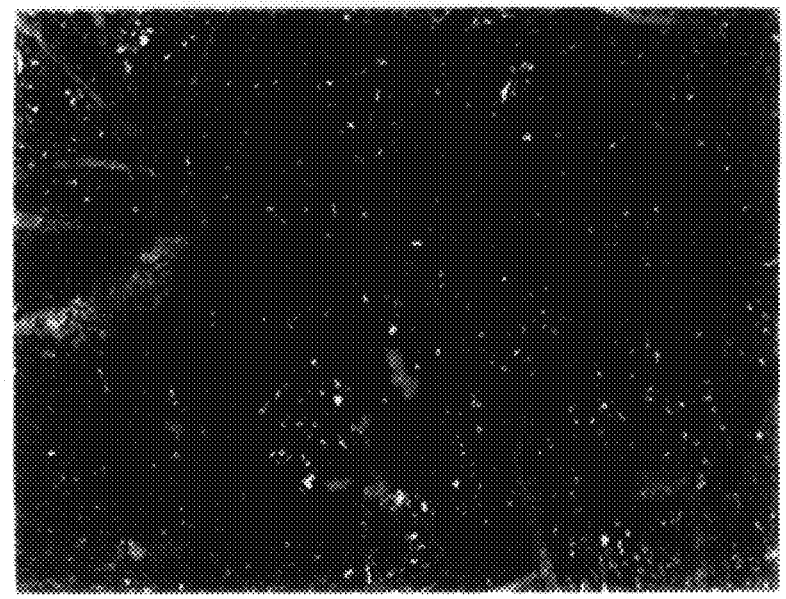
Figure 2A:
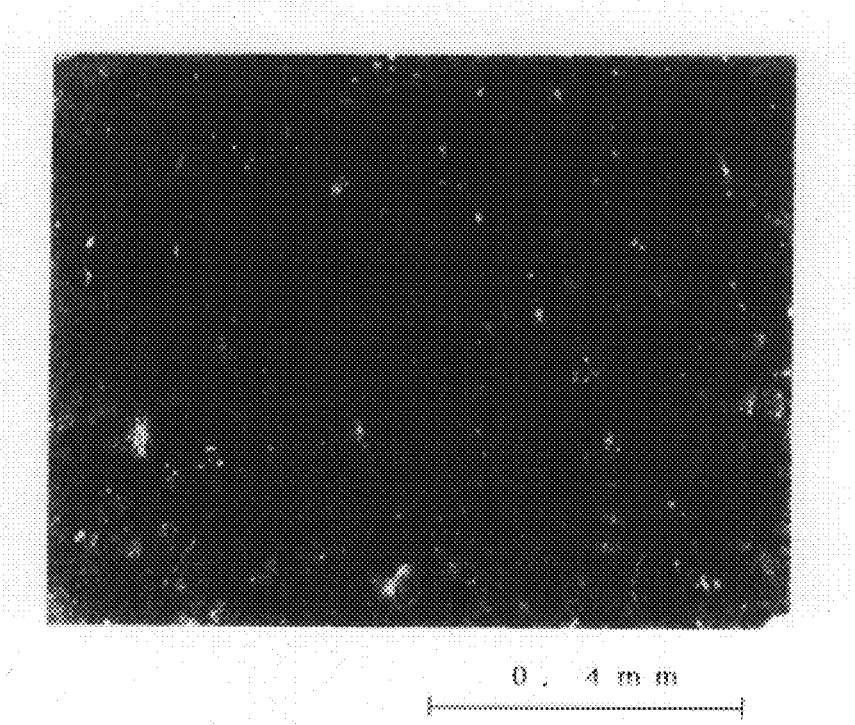
FIG. 2a is a photomicrograph at a magnification of 100 times and FIG. 2b a photomicrograph at a magnification of 400 times.
Figure 2B:
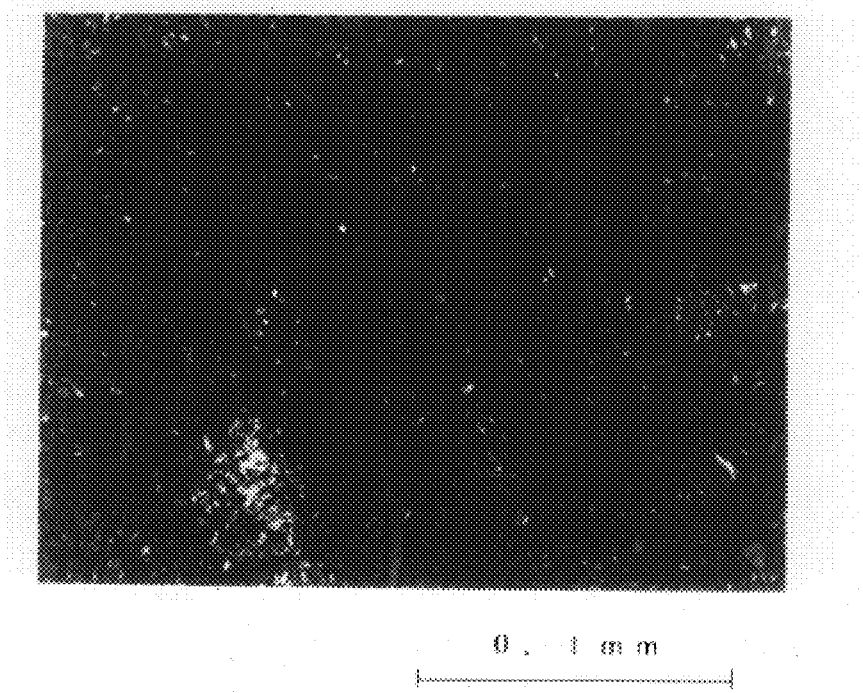
Figure 4A:
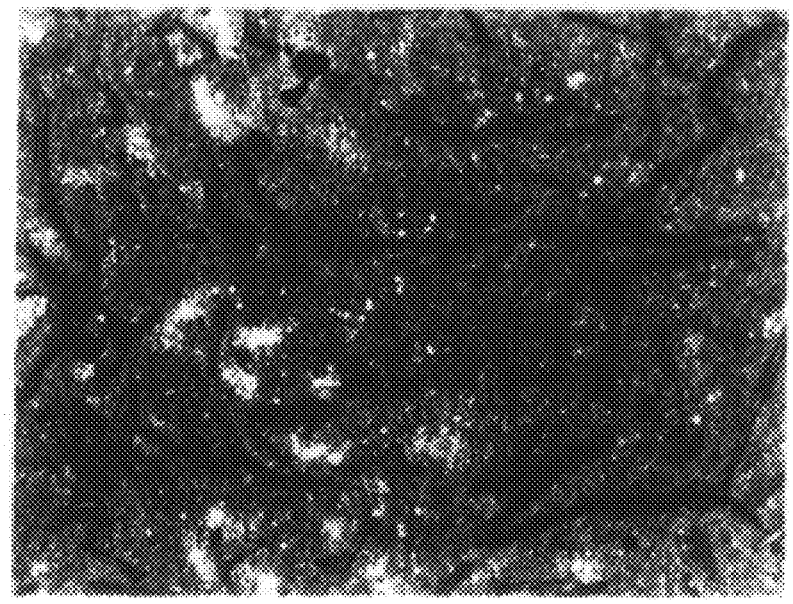
FIG. 4a is a photomicrograph at a magnification of 100 times and FIG. 4b a photomicrograph at a magnification of 400 times.
Figure 4B:
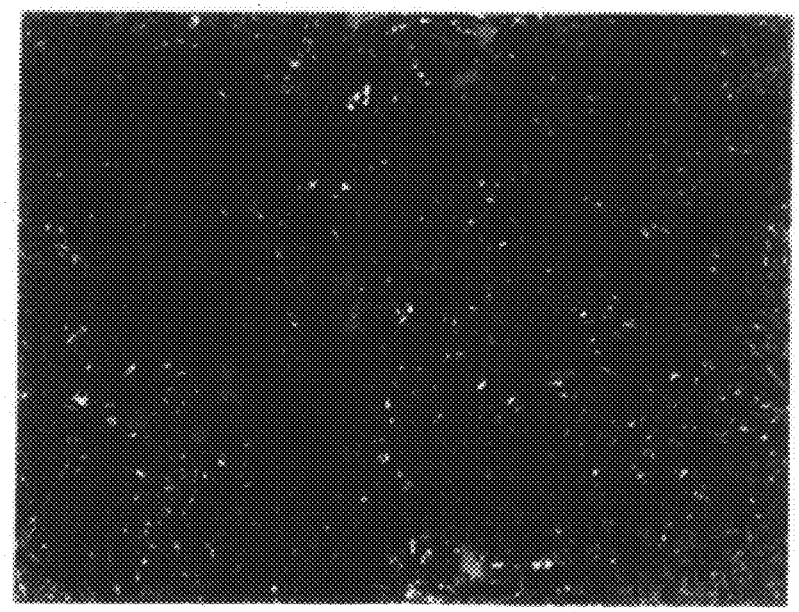
Figure 5A:
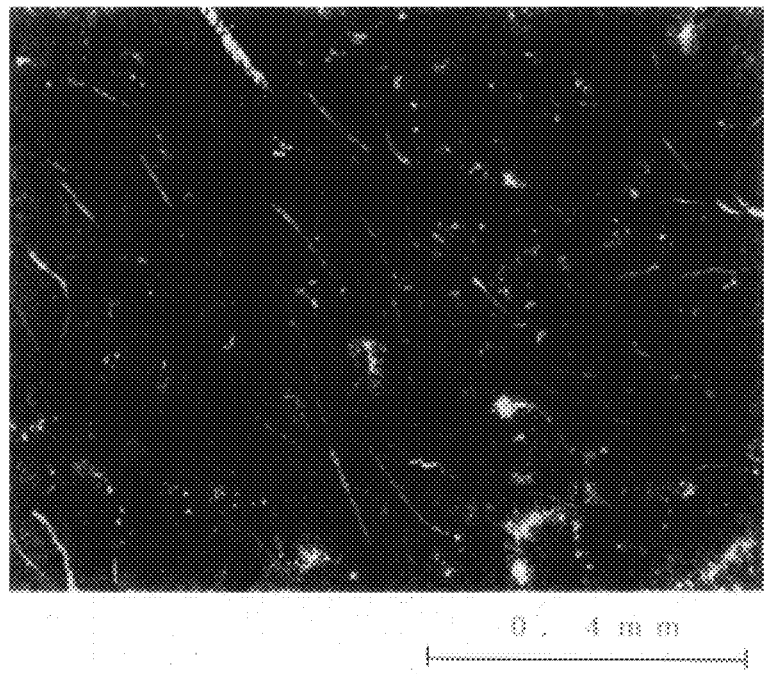
FIG. 5a is a photomicrograph at a magnification of 100 times and FIG. 5b a photomicrograph at a magnification of 400 times.
Figure 5B:
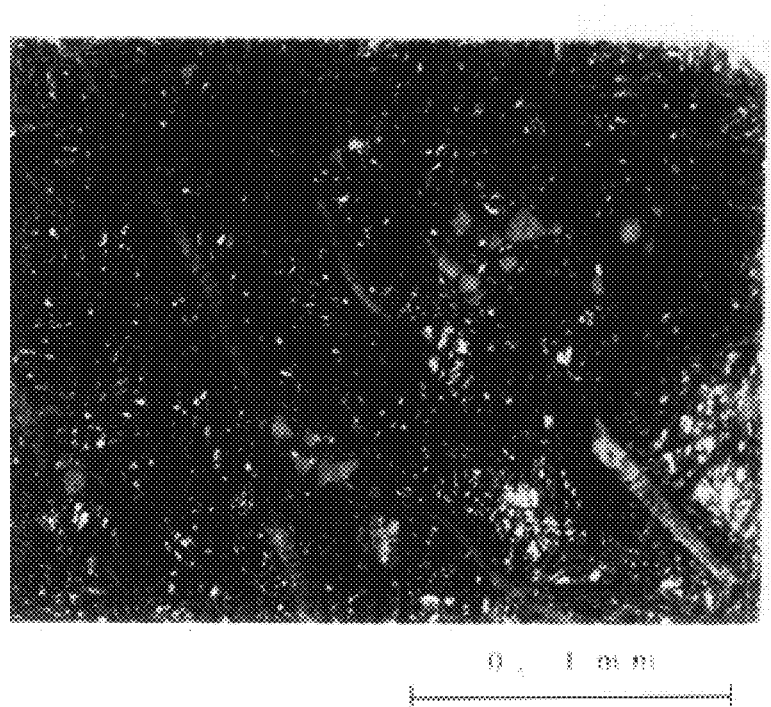
Figure 6A:
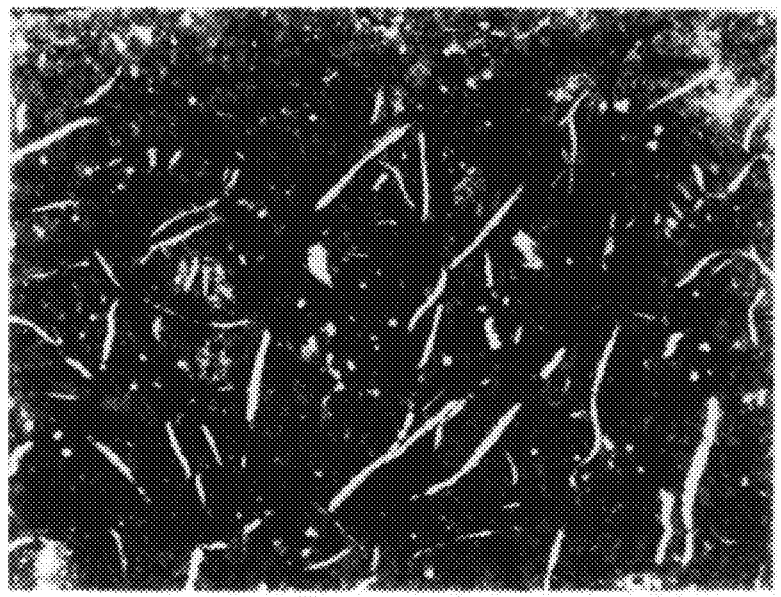
FIG. 6a is a photomicrograph at a magnification of 100 times and FIG. 6b a photomicrograph at a magnification of 400 times.
Figure 6B:
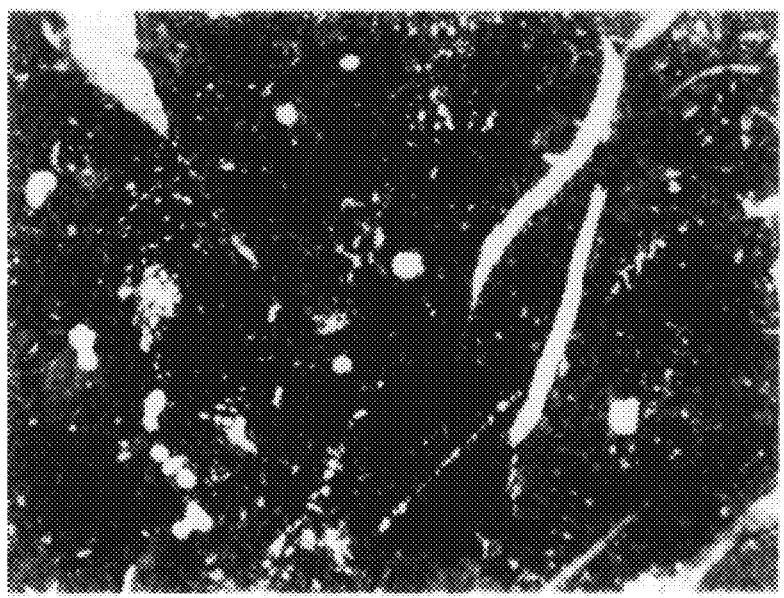
Figure 7A:
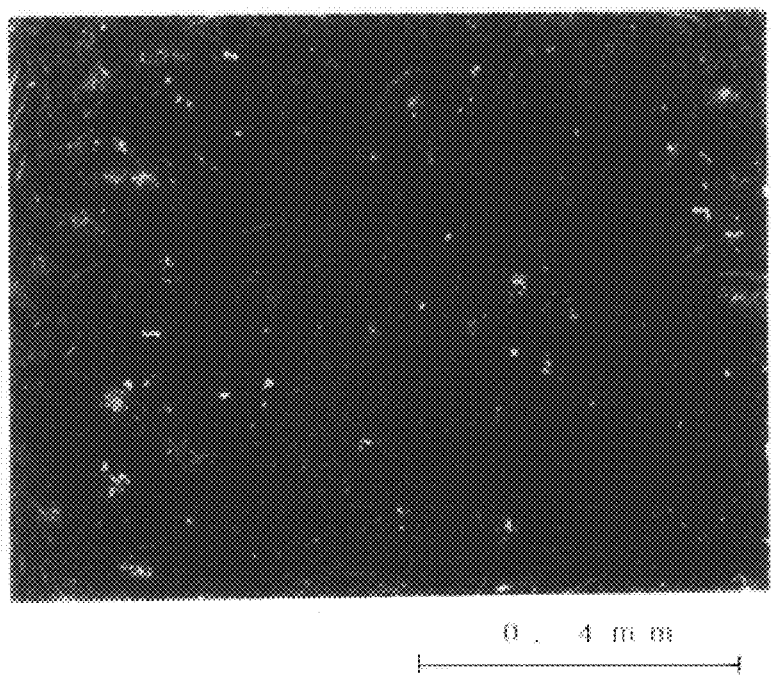
FIG. 7a is a photomicrograph at a magnification of 100 times and FIG. 7b a photomicrograph at a magnification of 400 times.
Figure 7B:
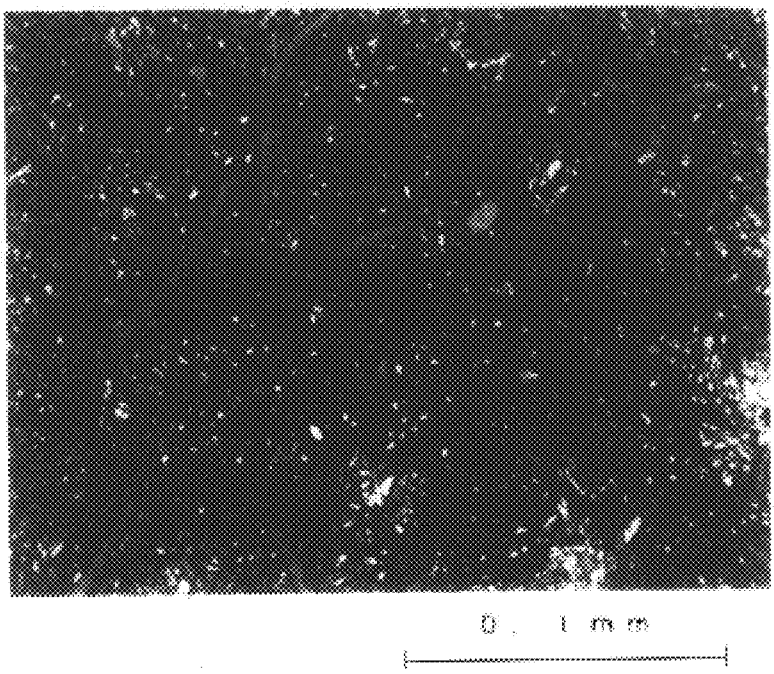

FIGS. 1 to 8 are metallographic photomicrographs of the specimens. Specifically, FIGS. 1 and 2 are metallographic photomicrographs of the specimen immersed in the molten aluminum alloy for 5 sec, FIGS. 3 and 4 metallographic photomicrographs of the specimen immersed in the molten aluminum alloy for 10 sec, FIGS. 5 and 6 metallographic photomicrographs of the specimen immersed in the molten aluminum alloy for 30 sec, and FIGS. 7 and 8 metallographic photomicrographs of the specimen immersed in the molten aluminum alloy for 60 sec. FIGS. 1, 3, 5, and 7 are metallographic photomicrographs of the specimens in their respective portions nonimmersed in the aluminum alloy, and FIGS. 2, 4, 6, and 8 metallographic photomicrographs of the specimens in their respective portions immersed in the aluminum alloy. For each drawing, a is a metallographic photomicrograph at a magnification of 100 times, and b a metallographic photomicrograph at a magnification of 400 times.

The relationship between the time of immersion of each specimen in the molten aluminum alloy and the hardness ($H_RC$) is shown in FIG. 9. From the metallographic photomicrographs, it is apparent that immersion for up to 10 sec caused no change in bainite structure (see FIGS. 2 and 4), whereas immersion for 30 sec and 60 sec caused part of the bainite structure to be transformed into a pearlite structure (see FIGS. 6 and 8).

Further, as is apparent from the results shown in FIG. 9, the hardness $H_RC$ 32 to 35 was maintained in the case of an immersion time up to 10 sec, whereas immersion for not less than 30 sec resulted in rapid lowering in the hardness to HRC 25.

The above results show that immersion for about 10 sec, which is performed in actual die casting, causes neither transformation of the bainite structure nor change in hardness of the BA material and permits the function of the BA material to be maintained.

EXAMPLE 2

The sectional form of a transmission is shown in FIG. 10. As shown in FIG. 10, the output of an engine is transmitted from a drive transmitting section 4 through an output axis 5 to a transmission section 6. In order to hold a bearing 8 for supporting an output axis 7, to which power has been transmitted from the transmission section 6, a bearing-supporting member 3 is inserted into a rear cover 2 for a transmission case. The transmission section 6 is entirely covered with a transmission case 1. FIG. 11 is a detailed view of the bearing-supporting member 3 and the rear cover 2 for a transmission case. This rear cover 2 for a transmission case was prepared by inserting the bearing-supporting member 3 into an aluminum alloy.

The cast iron material as the insert comprised by weight 3.04% of carbon, 2.27% of silicon, 0.76% of manganese, 0.307% of molybdenum, and 0.51% of copper with the balance consisting of iron, and the structure thereof comprised a flake graphite and retained austenite with the balance consisting of bainite, and the content of the retained austenite in the structure was 8.6%. This graphite cast iron member was used to prepare a bearing-supporting member 3 having an outer diameter of 80 mm, an inner diameter of 70 mm, and a thickness of 5 mm. Thereafter, the bearing-supporting member was inserted into a die-casting mold, and a molten aluminum alloy of 690° C. was injection poured at an injection pressure of 700 kg/cm$^2$ around the bearing-supporting member. Thus, a rear cover (B), for a transmission case, with a 4 mm-thick aluminum alloy section was prepared. The aluminum alloy, into which the cast iron material was inserted, comprised by weight 2.3% of copper, 10.5% of silicon, and 0.11% of magnesium with the balance consisting of aluminum.

For comparison, the whole rear cover for a transmission case was prepared by die casting without disposing the bearing-supporting member made of a graphite cast iron in a die casting mold. That is, the die casting was performed using the aluminum alloy alone to prepare a rear cover (A) for a transmission case.

The rear covers A and B for a transmission case were actually subjected to an engine drive bench test, wherein radiated sound level at each speed corresponding to the case where the rear cover for a transmission case was incorporated into an automobile was measured. The results are shown in FIG. 12. In the drawing, a curve A represents data for the comparative example, and a curve B data for the example of the present invention.

From the results shown in FIG. 12, it is apparent that the level of the radiated sound derived from the rear cover B for a transmission case according to the example of the present invention was lower than that derived from the rear cover A according to the comparative example. In particular, in a region around 85 km/hr and a region exceeding 95 km/hr, the level of the radiated sound derived from the rear cover for a transmission case according to the example of the present invention was lower than that derived from the rear cover according to the comparative example.

What is claimed is:

1. An aluminum alloy member, with an insert provided therein, possessing improved damping capacity, comprising: an austempered graphite cast iron member inserted into an aluminum alloy member with a major part having a thickness of not more than 6 mm.

2. The aluminum alloy member according to claim 1, wherein the graphite cast iron member is a flake graphite cast iron.

3. The aluminum alloy member according to claim 1, wherein the graphite cast iron member comprises by weight 2.5 to 4.0% of carbon, 2.0 to 3.5% of silicon, and 0.1 to 0.8% of manganese with the balance consisting of iron and unavoidable impurities, the graphite being in the form of a ISO type A austempered flake graphite.

4. The aluminum alloy member according to claim 1, wherein the graphite cast iron member comprises by weight 2.5 to 4.0% of carbon, 2.0 to 3.5% of silicon, 0.1 to 0.8% of manganese, and at least one member selected from the group consisting of 0.1 to 2.0% of copper, 0.1 to 2.0% of nickel, and 0.05 to 0.5% of molybdenum with the balance consisting of iron and unavoidable impurities, the graphite being in the form of a ISO type A austempered flake graphite.

5. The aluminum alloy member according to claim 1, wherein the graphite cast iron member has a structure comprising 5.0 to 14.0% of retained austenite with the balance consisting of a bainite structure.

6. The aluminum alloy member according to claim 1, wherein the aluminum alloy comprises by weight 2.0 to 4.0% of copper, 7 to 12% of silicon, and not more than 0.3% of magnesium with the balance consisting of aluminum and unavoidable impurities.

7. The aluminum alloy member according to claim 1, wherein said member is an automobile component.

8. An aluminum alloy member, with an insert provided therein, possessing improved damping capacity, comprising: a bearing-supporting member, comprised of an austempered graphite cast iron member, inserted into a rear cover of a transmission case, with a major part having a thickness of not more than 6 mm, comprising an aluminum alloy.

9. A process for producing an aluminum alloy member, with an insert provided therein, possessing improved damping capacity, comprising: subjecting an austempered graphite cast iron member to insert casting into an aluminum alloy with a major part having a thickness of not more than 6 mm in such a manner that cooling is performed so as for the temperature of the graphite cast iron member to reach 400° C. or below within 10 sec after pouring of the aluminum alloy.

10. The process according to claim 9, wherein the insert casting is die casting.

* * * * *